(12) United States Patent
Chamberlain et al.

(10) Patent No.: US 10,323,326 B2
(45) Date of Patent: Jun. 18, 2019

(54) COMPLIANT LAYER FOR CERAMIC COMPONENTS AND METHODS OF FORMING THE SAME

(71) Applicant: Rolls-Royce Corporation, Indianapolis, IN (US)

(72) Inventors: Adam Lee Chamberlain, Mooresville, IN (US); Kang N. Lee, Strongsville, OH (US); Andrew Joseph Lazur, Laguna Beach, CA (US)

(73) Assignee: Rolls-Royce Corporation, Indianapolis, IN (US)

( * ) Notice: Subject to any disclaimer, the term of this patent is extended or adjusted under 35 U.S.C. 154(b) by 255 days.

(21) Appl. No.: 15/359,309

(22) Filed: Nov. 22, 2016

(65) Prior Publication Data
US 2017/0073820 A1   Mar. 16, 2017

Related U.S. Application Data

(62) Division of application No. 14/205,010, filed on Mar. 11, 2014, now Pat. No. 9,527,777.
(Continued)

(51) Int. Cl.
*C23C 30/00* (2006.01)
*C04B 41/88* (2006.01)
(Continued)

(52) U.S. Cl.
CPC .............. *C23C 30/00* (2013.01); *C04B 35/71* (2013.01); *C04B 41/009* (2013.01);
(Continued)

(58) Field of Classification Search
CPC ......... F05D 2300/6033; F05D 2240/30; F05D 2230/90; F05D 2300/10; F05D 2220/32; F05D 2220/30; C04B 41/88; C04B 41/90; C04B 41/009; C04B 41/5105; C04B 41/5133; C04B 41/52; C04B 35/565; C04B 35/806; C04B 35/584; C04B 35/10; C04B 35/803; C04B 35/18; C04B 41/5096; C04B 41/5144; C04B 41/5155; C04B 41/5094;
(Continued)

(56) References Cited

U.S. PATENT DOCUMENTS 2,854,739 A   10/1958   Bartlett et al.
4,417,854 A   11/1983   Cain et al.
(Continued)

FOREIGN PATENT DOCUMENTS

JP   2007106644 A   4/2007

OTHER PUBLICATIONS

Invitation to Pay Additional Fees from counterpart international application No. PCT/US2014/023646, dated Jun. 30, 2014, 6 pp.
(Continued)

*Primary Examiner* — Michael E. La Villa
(74) *Attorney, Agent, or Firm* — Shumaker & Sieffert, P.A.

(57) ABSTRACT

An apparatus includes a ceramic matrix composite (CMC) component and an interface coating on the CMC component, wherein the interface coating includes a layer of at least one of the following compositions: 40-50 wt % Nb, 28-42 wt % Al, 4-15 wt % Cr, 1-2 wt % Si; 90-92 wt % Mo, 4-5 wt % Si, 4-5 wt % B; or 60-80 wt % V, 20-30 wt % Cr, 2-15 wt % Ti.

22 Claims, 2 Drawing Sheets

Related U.S. Application Data

(60) Provisional application No. 61/776,192, filed on Mar. 11, 2013.

(51) Int. Cl.

| | |
|---|---|
| *C04B 41/51* | (2006.01) |
| *C04B 41/52* | (2006.01) |
| *C04B 41/90* | (2006.01) |
| *C04B 35/71* | (2006.01) |
| *F01D 5/28* | (2006.01) |
| *C22C 27/02* | (2006.01) |
| *C22C 27/06* | (2006.01) |
| *C04B 41/00* | (2006.01) |
| *C04B 41/89* | (2006.01) |
| *F01D 5/30* | (2006.01) |

(52) U.S. Cl.
CPC ...... *C04B 41/5105* (2013.01); *C04B 41/5133* (2013.01); *C04B 41/5138* (2013.01); *C04B 41/5144* (2013.01); *C04B 41/5155* (2013.01); *C04B 41/52* (2013.01); *C04B 41/522* (2013.01); *C04B 41/88* (2013.01); *C04B 41/89* (2013.01); *C04B 41/90* (2013.01); *C22C 27/02* (2013.01); *C22C 27/025* (2013.01); *C22C 27/06* (2013.01); *C23C 30/005* (2013.01); *F01D 5/282* (2013.01); *F01D 5/284* (2013.01); *F01D 5/288* (2013.01); *F01D 5/3007* (2013.01); *F05D 2220/30* (2013.01); *F05D 2220/32* (2013.01); *F05D 2230/90* (2013.01); *F05D 2240/30* (2013.01); *F05D 2300/10* (2013.01); *F05D 2300/6033* (2013.01); *Y10T 428/12674* (2015.01); *Y10T 428/12743* (2015.01); *Y10T 428/12847* (2015.01); *Y10T 428/12875* (2015.01); *Y10T 428/12896* (2015.01); *Y10T 428/12937* (2015.01); *Y10T 428/12944* (2015.01)

(58) Field of Classification Search
CPC .............. C04B 41/522; C04B 41/5161; C04B 41/5116; C04B 41/5122; C04B 41/5127; C04B 41/5024; C04B 41/5037; C04B 41/5138; C04B 35/71; F01D 5/3007; F01D 5/284; F01D 5/288; F01D 5/282; C23C 30/00; C23C 30/005; C22C 27/02; C22C 27/025; C22C 27/06; Y10T 428/12674; Y10T 428/12743; Y10T 428/12875; Y10T 428/12896; Y10T 428/12847; Y10T 428/12954; Y10T 428/12944; Y10T 428/12937

See application file for complete search history.

(56) References Cited

U.S. PATENT DOCUMENTS

| | | | |
|---|---|---|---|
| 4,983,358 | A | 1/1991 | Hebsur et al. |
| 5,281,487 | A | 1/1994 | Rumaner et al. |
| 5,435,889 | A | 7/1995 | Dietrich |
| 5,460,663 | A | 10/1995 | Hashimoto et al. |
| 5,482,577 | A | 1/1996 | Hashimoto et al. |
| 5,718,777 | A | 2/1998 | Hashimoto et al. |
| 5,865,909 | A | 2/1999 | Meyer et al. |
| 6,132,175 | A | 10/2000 | Cai et al. |
| 7,806,995 | B2 | 10/2010 | Jehanno |
| 7,887,929 | B2 | 2/2011 | Strock et al. |
| 2006/0140771 | A1 | 6/2006 | Carper et al. |
| 2006/0154093 | A1 | 7/2006 | Meschter et al. |
| 2009/0068004 | A1 | 3/2009 | Benoit et al. |
| 2010/0230299 | A1* | 9/2010 | Aoki .................... C01B 3/0031 206/0.7 |
| 2011/0076480 | A1 | 3/2011 | Skoog et al. |
| 2014/0134455 | A1 | 5/2014 | Bolcavage et al. |
| 2016/0137559 | A1 | 5/2016 | Chamberlain et al. |

OTHER PUBLICATIONS

International Search Report and Written Opinion of counterpart international application No. PCT/US2014/023646, dated Jan. 21, 2015, 16 pp.

International Preliminary Report on Patentability from International Application No. PCT/US2014/023646, dated Sep. 24, 2015, 11 pp.

Prosecution History from U.S. Appl. No. 14/205,010, dated May 3, 2016 through Aug. 22, 2016, 28 pp.

* cited by examiner

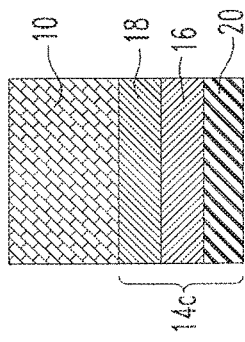
Fig. 4
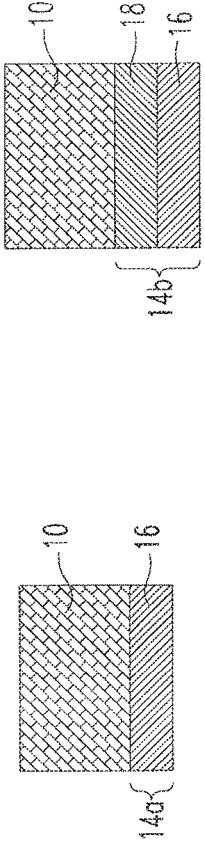
Fig. 3
Fig. 2
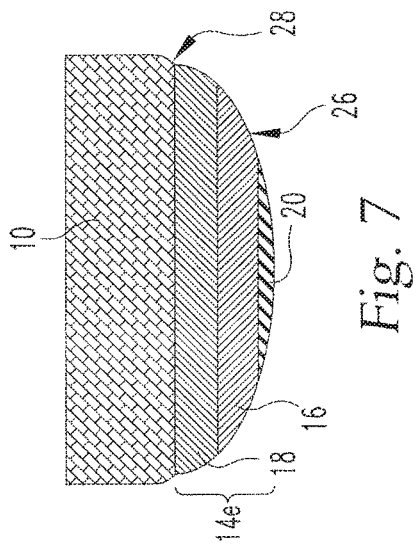
Fig. 7
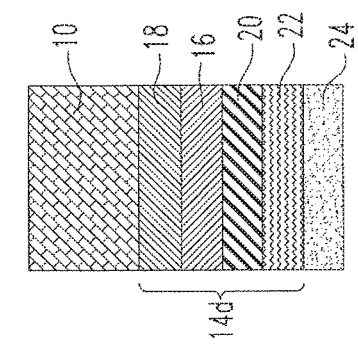
Fig. 6
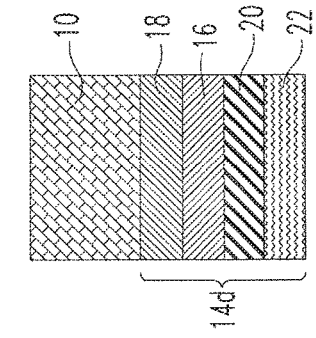
Fig. 5

COMPLIANT LAYER FOR CERAMIC COMPONENTS AND METHODS OF FORMING THE SAME

This application is a divisional of U.S. application Ser. No. 14/205,010, filed on Mar. 11, 2014, entitled, "COMPLIANT LAYER FOR CERAMIC COMPONENTS AND METHODS OF FORMING THE SAME", which claims the benefit of U.S. Provisional Application No. 61/776,192, filed Mar. 11, 2013, each of which is incorporated herein by reference in its entirety.

BACKGROUND

The components of high-temperature mechanical systems, such as, for example, gas-turbine engines, must operate in severe environments. For example, the high-pressure turbine blades, vanes, blade tracks and blade shrouds exposed to hot gases in commercial aeronautical engines typically experience metal surface temperatures of about 1000° C., with short-term peaks as high as 1100° C. Economic and environmental concerns, i.e., the desire for improved efficiency and reduced emissions, continue to drive the development of advanced gas turbine engines with higher inlet temperatures. In some cases, this may lead to the replacement of a superalloy component with a silicon-based ceramic or ceramic matrix composite (CMC) component. Silicon-based ceramics or CMCs possess excellent high temperature mechanical, physical and chemical properties, and may allow gas turbine engines to operate at higher temperatures than gas turbine engines having superalloy components.

SUMMARY

In various locations within a turbine engine such as, for example, in a blade track, a CMC component may be mechanically loaded against a metallic structure. In some embodiments, the surface of the CMC component may have a sandpaper-like abrasive texture. When the CMC component contacts the metallic structure, the sandpaper-like abrasive texture of the CMC component can cause excessive wear on the metallic structure. The extremely hard CMC component lacks ductility, and contact with the metallic structure can damage the CMC component. The present disclosure is directed to an interface coating system on a CMC component that can, in some embodiments, distribute load more evenly between the CMC component and adjacent metallic structures and form a protective barrier to protect the CMC component from degradation.

In one aspect, the present disclosure is directed to an apparatus including a ceramic matrix composite (CMC) component and an interface coating on the CMC component, wherein the interface coating includes a layer of 60-80 wt % V, 20-30 wt % Cr, and 2-15 wt % Ti.

In another aspect, the present disclosure is directed to a ceramic matrix composite (CMC) component with an interface coating system thereon, wherein the interface coating system includes:

a bond coating on a surface of the CMC component, wherein the bond coating includes Si;

an interface coating on the bond coating, wherein the interface coating includes a layer of 60-80 wt % V, 20-30 wt % Cr, and 2-15 wt % Ti;

a corrosion-resistant coating on the interface coating, wherein the corrosion resistant coating includes an alloy with at least one of Ti, Al, or V, an alloy with at least one of Ti, Al, Sn, Zr, or Mo, or an alloy with Ni and Cr; and a compliance-enhancing coating on the corrosion-resistant coating, wherein the compliance-enhancing coating includes at least one of Pt, Ag, Cu Ni Cr Co or Mo.

In yet another aspect, the present disclosure is directed to a method including forming an interface coating on a ceramic matrix composite (CMC) component such that the interface coating is bonded to the ceramic component, wherein the interface coating includes a layer of 60-80 wt % V, 20-30 wt % Cr, and 2-15 wt % Ti.

In yet another aspect, the present disclosure is directed to a turbine engine component including a ceramic matrix composite (CMC) component, wherein the CMC component is loaded against a metal part, wherein the CMC component includes an interface coating adjacent to the metal part, the interface coating including a layer of 60-80 wt % V, 20-30 wt % Cr, and 2-15 wt % Ti.

In various embodiments, the interface coatings described in this disclosure can provide one or more of the following advantages: (1) improved load distribution and reduction of point loading on the CMC component; (2) reduction or elimination of wear on metallic hardware adjacent to the CMC component; (3) reduction of CMC machining to produce features with the tight tolerances (tight tolerances can be machined in the interface coating); (4) the interface coatings may enable joining operations to the CMC part such as diffusion bonding, e-beam or laser welding, brazing, or a combination thereof; (5) the interface coatings may function as a barrier to elemental diffusion and/or reaction between the CMC component and the metallic structure to which the CMC component is attached; and (6) the interface coatings may function as a barrier to oxygen, steam, or other environmental materials to prevent local degradation of the CMC part.

The details of one or more embodiments are set forth in the accompanying drawings and the description below. Other features, objects, and advantages will be apparent from the description and drawings, and from the claims.

BRIEF DESCRIPTION OF DRAWINGS

FIG. 2 is an enlarged partial sectional view taken through region A of FIG. 1 showing a schematic illustration of an interface coating system.

FIG. 3 is an enlarged partial sectional view taken through region A of FIG. 1 showing a schematic illustration of an interface coating system.

FIG. 4 is an enlarged partial sectional view taken through region A of FIG. 1 showing a schematic illustration of an interface coating system.

FIG. 5 is an enlarged partial sectional view taken through region A of FIG. 1 showing a schematic illustration of an interface coating system.

FIG. 6 is a schematic illustration of one embodiment of an outer layer formed on an interface coating system.

FIG. 7 is a schematic illustration of an interface coating system bonded to a CMC component.

Like symbols in the drawings indicate like elements.

DETAILED DESCRIPTION

Figure 1:
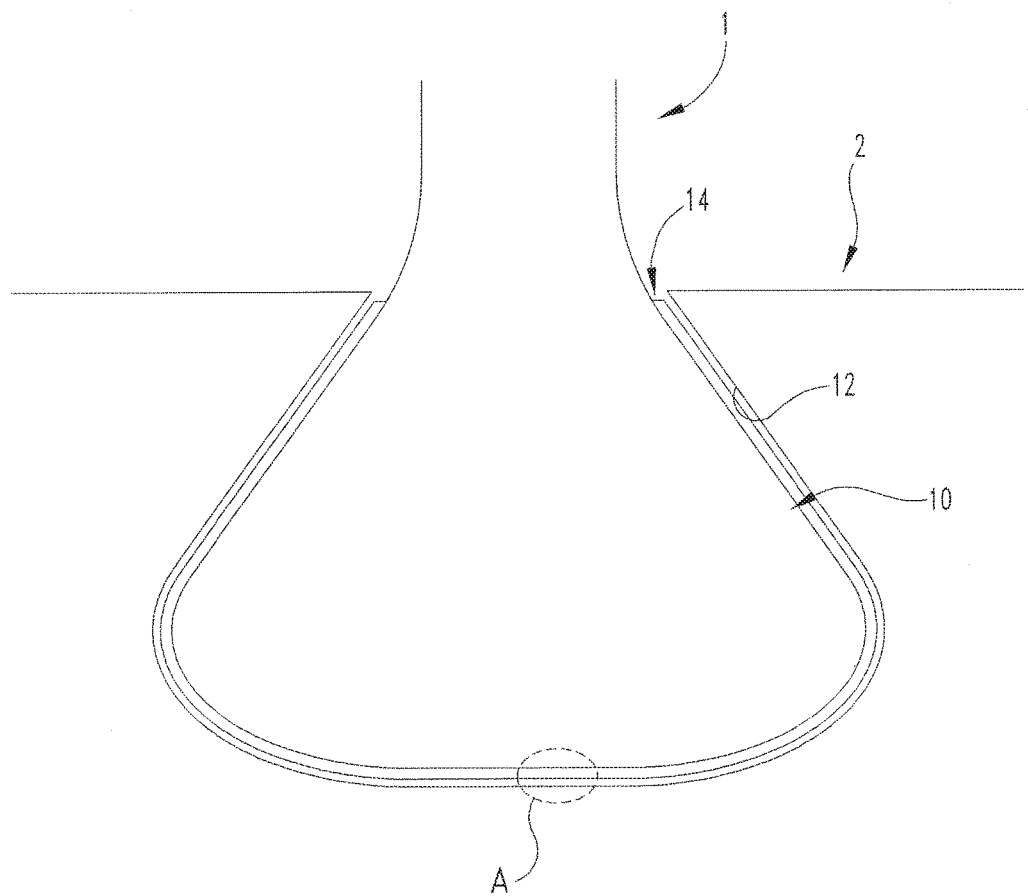
FIG. 1 is a schematic illustration of an interface coating system bonded to a CMC component.

FIG. 1 is a schematic illustration of a ceramic matrix composite (CMC) rotor blade 1 having a root portion 10, a metallic rotor disk 2 defining a slot or opening 12, and an interface coating 14 system on the CMC rotor blade 1. The slot 12 in the rotor disk 2 receives the root portion 10 of the CMC rotor blade 1, and the interface coating 14 is positioned between the rotor blade 1 and the rotor disk 2. The example in FIG. 1 is not intended to be limiting, and the interface coating 14 can be applied to a wide variety of turbine engine components with a wide variety of shapes, and may be applied to CMC parts that engage metal components axially, radially, and/or circumferentially.

A ceramic or CMC may include any useful ceramic material, including, for example, silicon carbide, silicon nitride, alumina, silica, and the like. The CMC may further include any desired filler material, and the filler material may include a continuous reinforcement or a discontinuous reinforcement. For example, the filler material may include discontinuous whiskers, platelets, or particulates. As another example, the filler material may include a continuous monofilament or multifilament weave.

The filler composition, shape, size, and the like may be selected to provide the desired properties to the CMC. For example, the filler material may be chosen to increase the toughness of a brittle ceramic matrix. The filler may also be chosen to modify a thermal conductivity, electrical conductivity, thermal expansion coefficient, hardness, or the like of the CMC.

In some embodiments, the filler composition may be the same as the ceramic matrix material. For example, a silicon carbide matrix may surround silicon carbide whiskers. In other embodiments, the filler material may include a different composition than the ceramic matrix, such as aluminum silicate fibers in an alumina matrix, or the like. One preferred CMC includes silicon carbide continuous fibers embedded in a silicon carbide matrix.

Some example ceramics and CMCs which may be used include ceramics containing Si, such as SiC and $Si_3N_4$; composites of SiC or $Si_3N_4$ and silicon oxynitride or silicon aluminum oxynitride; metal alloys that include Si, such as a molybdenum-silicon alloy (e.g., $MoSi_2$) or niobium-silicon alloys (e.g., $NbSi_2$); and oxide-oxide ceramics, such as an alumina or aluminosilicate matrix with a ceramic oxide fiber such as those available from 3M Co., St. Paul, Minn., under the trade designation NEXTEL 720.

The interface coating system 14 may be applied directly onto a surface of a CMC component, and may include a single layer or multiple layers of the same or different materials. In various embodiments, the individual layers of the interface coating system 14 can have a thickness of about 0.00001 inches to about 0.025 inches (about 0.00025 mm to about 0.635 mm). The layers of interface coating system 14 can be applied or coated onto the CMC component 1 by any suitable process such as, for example, direct vapor deposition (DVD), electron-beam physical vapor deposition (EBPVD), plasma spraying (e.g., atmospheric plasma spraying, or APS), chemical vapor deposition (CVD), and combinations thereof.

In various embodiments, the interface coating system 14 can include single or multiple layers of one or more of the following interface coating compositions (all values in this application are ±1 wt %), which will be referred to herein for clarity as the interface coating composition:

(1) 40-50 wt % Nb, 28-42 wt % Al, 4-15 wt % Cr, 1-2 wt % Si;

(2) 90-92 wt % Mo, 4-5 wt % Si, 4-5 wt % B; or (3) 60-80 wt % V, 20-30 wt % Cr, 2-15 wt % Ti.

Any of the interface coating compositions above can optionally include a low expansion metal alloy, and examples include, but are not limited to, Ti alloys such as Ti 6-4 and Ti 6-2-4-2; Ni—Co—Fe alloys such as those available from Special Metals Corp., Huntington, W.V. under the trade designation Inconel, such as Inconel 783; and Ni—Mo—Cr alloys such as those available from Haynes International, Inc., Kokomo, Ind., under the trade designation Haynes alloy 242.

In some embodiments, the interface coating has a coefficient of thermal expansion (CTE) of about $4 \times 10^{-6}$ to about $6 \times 10^{-6}$/° F., which closely matches the CTE of the underlying CMC part. Referring to FIG. 2, in one embodiment this matching CTE makes possible an interface coating system 14a including an interface coating 16 coated directly onto a surface of a CMC component 10. In this example and all the examples that follow, the interface coating 16 can include a single or multiple layers made from any of the interface coating compositions above.

Referring to FIG. 3, an interface coating system 14b includes a bond coating 18 on a surface of a CMC component 10, and an interface coating 16 on the bond coating 18. The bond coating 18 can be applied directly onto the surface of the CMC component 10 by any suitable process such as DVD, EBPVD, plasma spraying, or a combination thereof. In various embodiments, the bond coating 18 can include single or multiple layers and has a thickness of about 0.001 inches to about 0.010 inches (about 0.025 mm to 0.254 mm).

In various embodiments, the bond coating 18 may include mullite (aluminum silicate, $Al_6Si_2O_{13}$), silica, silicides, silicon, or the like. The bond coating 18 may further include other ceramics, such as rare earth silicates including silicates of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium) La (lanthanum), Y (yttrium), and Sc (scandium). In some embodiments, the bond coating for depositing over the CMC substrate includes silicon, mullite, and ytterbium silicate, and in some embodiments consists of Si.

The interface coating system 14b can be used as processed, or additional heat treatments at about 2000° F. to about 2400° F. (about 1100° C. to about 1325° C.) can be applied to the coated part to further enhance bonding. Heat treatments at these temperatures can result in a diffusion zone between the bond layer 18 and the interface coating 16, which in some embodiments can enhance bonding of the layers to the CMC part.

Referring to FIG. 4, an interface coating system 14c includes an optional bond coating 18 formed on a surface of the CMC component 10, an interface coating 16, and a corrosion-resistant coating 20 formed on the interface coating 16. The corrosion-resistant coating 20 can be formed by any suitable process such as DVD, EBPVD, plasma spraying, or a combination thereof. In various embodiments, the corrosion-resistant coating 20 can have a thickness of about 0.00001 inches to about 0.025 inches (about 0.00025 mm to 0.635 mm). The composition of the corrosion-resistant coating 20 is selected to provide a barrier to environmental agents such as, for example, oxygen, steam, and other species capable of degrading the CMC component 10. In one embodiment, the composition of the corrosion-resistant coating 20 is selected such that the corrosion-resistant coating 20 has a relatively low coefficient of thermal expansion (e.g., about $5 \times 10^{-6}$ to about $8 \times 10^{-6}$/° F.). In some embodiments, the corrosion-resistant coating 20 can include an alloy including any of Ti, Al, and V, an alloy including any of Ti, Al, Sn, Zr, and Mo, or an alloy including Ni and Cr. In some embodiments, the corrosion-resistant coating 20 can include Ti-6Al-4V, Ti-6Al-25n-4Zr-2Mo, INCONEL 783, HAYNES 242, and the like.

After the bond coating 18 (if any) and the interface coating 16 are applied to the CMC part, and optionally heat treated as set forth above, the corrosion-resistant coating 20 can be applied on the interface coating 16. After the corrosion-resistant coating 20 is applied, the coating system 14c can optionally be subjected to a second heat treatment to create desirable microstructures and/or phases within the corrosion-resistant coating 20. Annealing during the second heat treatment can be performed at a temperature greater than or equal to about 2000° F. (about 1100° C.).

Referring to FIG. 5, an interface coating 14d includes an optional bond coating 18 on a CMC component 10, an interface coating 16, an optional corrosion-resistant coating 20, and a compliance-enhancing coating 22. After forming the corrosion-resistant coating 20, the compliance-enhancing coating 22 can be formed by any suitable process such as DVD, EBPVD, plasma spraying, CVD, or a combination thereof. In one embodiment, the corrosion-resistant layer 20 can have a thickness of about 0.00001 inches to about 0.025 inches (about 0.00025 mm to 0.635 mm). The composition of the compliance-enhancing coating 22 is selected to further enhance the uniformity with which loads are distributed between the CMC component 10 and another CMC or metallic part. In various embodiments, the compliance-enhancing layer 22 can include at least one material selected from Pt, Ag, Cu, Ni, Cr, Co, and Mo. In some embodiments, the compliance-enhancing coating 22 can include a Cu alloy, an Ag alloy, Co—Cr—Mo alloys such as those available from Rolled Alloys, Inc., Temperance, Mich., under the trade designations TRIBALOY T400, TRIBALOY T800, or a combination thereof. As with all the coatings in this application, it should be appreciated that the compliance-enhancing coating 22 can be formed of a single layer, or of multiple layers having the same or different compositions. Although FIG. 5 illustrates the interface coating system 14d as including an optional bond coating 18 and an optional corrosion-resistant coating 20, the interface coating 16 shown in FIG. 5 may be coated directly onto the surface of the CMC component 10, and the compliance-enhancing coating may be formed directly on the interface coating 16.

Referring to FIG. 6, an outer coating 24 may be formed on all or a part of the interface coating system 14d. The outer coating 24 can include components such as an environmental barrier coating, a thermal barrier coating, or a combination thereof. In some embodiments, a bilayer or multilayer coating may provide thermal protection and resistance to oxidation, water vapor attack, or the like. In some embodiments, the thermal barrier coating may be deposited over the environmental barrier coating, while in other embodiments, the environmental barrier coating may be deposited over the thermal barrier coating.

Components of the outer coating 24 can be formed by any suitable process such as DVD, EBPVD, plasma spraying, CVD, or a combination thereof. In one embodiment, each component of the outer coating 24 can have a thickness of about 0.00001 inches to about 0.025 inches (about 0.00025 mm to 0.635 mm). It should be appreciated that the outer coating 24 can be formed on any of the interface coating systems described above in FIGS. 1 to 5.

Suitable examples of outer coatings include environmental barrier coatings such as, for example, mullite; glass ceramics such as barium strontium alumina silicate ($BaO_x$—$SrO_{1-x}$—$Al_2O_3$-$2SiO_2$; BSAS), barium alumina silicate ($BaO$—$Al_2O_3$-$2SiO_2$; BAS), calcium alumina silicate ($CaO$—$Al_2O_3$-$2SiO_2$), strontium alumina silicate ($SrO$—$Al_2O_3$-$2SiO_2$; SAS), lithium alumina silicate ($Li_2O$—$Al_2O_3$-$2SiO_2$; LAS) and magnesium alumina silicate ($2MgO$-$2Al_2O_3$-$5SiO_2$; MAS); rare earth silicates and the like.

Suitable examples of thermal barrier coatings, which may provide thermal insulation to the CMC substrate to lower the temperature experienced by the substrate, include, but are not limited to, insulative materials such as ceramic layers with zirconia or hafnia. The thermal barrier coating may optionally include other elements or compounds to modify a desired characteristic of the coating, such as, for example, phase stability, thermal conductivity, or the like. Exemplary additive elements or compounds include, for example, rare earth oxides.

In some embodiments, the surfaces of one or more of the layers of any of the interface coating systems described above in FIGS. 1 to 6 can be treated (e.g., machined, polished, ground, cut, burnished, galled, drilled, or the like or a combination thereof) to achieve a desired dimension, surface morphology or chemistry. For example, one or more of the layers of any of the interface coating systems described above may be machined to vary the thickness thereof or to introduce surface features (e.g., grooves, mesas, dimples, apertures, asperities, or the like or a combination thereof). In one embodiment, one or more of the layers of any of the interface coating systems described above in FIGS. 1 to 6 can be treated to blend the edges thereof into the surface of the CMC component 10. For example, in one example embodiment shown in FIG. 7, an interface coating system 14e is provided including an optional bond coating 18, an interface coating 16, and an optional corrosion-resistant coating 20. The interface coating system 14e is treated (e.g., machined) to form an edge 26 that is blended with an edge 28 of the CMC part 10. Thereafter, an additional layer (e.g., a compliance-enhancing coating 22 and/or an outer layer 24 as described above) can be formed over the edge 26 to cover the exposed portions of the corrosion-resistant layer 20, the compliant layer 16, and the bond layer 18.

Various embodiments of the invention have been described. These and other embodiments are within the scope of the following claims.

The invention claimed is:

1. An apparatus, comprising:
   a ceramic matrix composite (CMC) component loaded against a metal part; and
   an interface coating on the CMC component, wherein the interface coating comprises a layer with a composition of 60-80 wt % V, 20-30 wt % Cr, and 2-15 wt % Ti, based on the total weight of the composition, and wherein the interface coating is between the CMC component and the metal part.

2. The apparatus of claim 1, wherein the interface coating further comprises Ni—Co—Fe.

3. The apparatus of claim 1, wherein the interface coating has a coefficient of thermal expansion (CTE) of about $4 \times 10^{-6}$ to about $6 \times 10^{-6}/°$ F.

4. The apparatus of claim 1, further comprising a bond layer between a surface of the CMC component and the interface coating.

5. The apparatus of claim 4, wherein the bond layer comprises Si.

6. The apparatus of claim 4, wherein the bond layer consists of Si.

7. The apparatus of claim 1, further comprising a corrosion-resistant coating on the interface coating, wherein the corrosion-resistant coating comprises an alloy comprising at least one of Ti, Al, or V, an alloy comprising at least one of Ti, Al, Sn, Zr, or Mo, or an alloy comprising Ni and Cr.

8. The apparatus of claim 7, wherein the corrosion-resistant coating comprises at least one of Ti—Al—V, Ti—Al—Sn—Zr—Mo, Ni—Cr, or Ni—Mo—Cr.

9. The apparatus of claim 1, further comprising a compliance-enhancing coating on the interface coating, wherein the compliance-enhancing coating comprises at least one of Pt, Ag, Cu, Ni, Cr, Co, or Mo.

10. The apparatus of claim 9, wherein the compliance-enhancing coating comprises at least one of a Cu alloy, an Ag alloy, or Co—Cr—Mo.

11. The apparatus of claim 1, further comprising an outer coating on the interface coating, wherein the outer coating is selected from at least one of an environmental barrier coating or a thermal barrier coating.

12. A turbine engine component comprising the apparatus of claim 1.

13. A ceramic matrix composite (CMC) component with an interface coating system thereon, the interface coating system comprising:
   a bond coating on a surface of the CMC component, wherein the bond coating comprises Si;
   an interface coating on the bond coating, wherein the interface coating comprises a layer with a composition of 60-80 wt % V, 20-30 wt % Cr, and 2-15 wt % Ti, based on the total weight of the composition;
   a corrosion-resistant coating on the interface coating, wherein the corrosion resistant coating comprises an alloy comprising at least one of Ti, Al, or V, an alloy comprising at least one of Ti, Al, Sn, Zr, or Mo, or an alloy comprising Ni and Cr; and
   a compliance-enhancing coating on the corrosion-resistant coating, wherein the compliance-enhancing coating comprises at least one of Pt, Ag, Cu, Ni, Cr, Co, or Mo.

14. The component of claim 13, further comprising at least one outer coating on the compliance-enhancing coating.

15. The component of claim 13, wherein the bond coating consists of Si.

16. A method, comprising:
   forming an interface coating on a ceramic matrix composite (CMC) component such that the interface coating is bonded to the ceramic component, wherein the interface coating comprises layer with a composition of 60-80 wt % V, 20-30 wt % Cr, and 2-15 wt % $Ti_m$ based on the total weight of the composition; and
   placing the CMC component adjacent to a metal component such that the interface coating is between the CMC component and a metal component.

17. The method of claim 16, further comprising forming a bond coating on the CMC part prior to forming the interface coating, wherein the bond coating comprises Si.

18. The method of claim 17, further comprising heat treating the bond coating and the interface coating to about 1100° C. to about 1325° C.

19. The method of claim 16, further comprising forming a corrosion-resistant coating on the interface coating, wherein the corrosion resistant coating comprises an alloy comprising at least one of Ti, Al, or V, an alloy comprising at least one of Ti, Al, Sn, Zr, or Mo, or an alloy comprising Ni and Cr.

20. The method of claim 19, further comprising heating the interface coating and the corrosion-resistant coating to a temperature of about 1100° C.

21. The method of claim 19, further comprising forming a compliance-enhancing coating on the corrosion-resistant coating, wherein the compliance-enhancing coating comprises at least one of Pt, Ag, Cu, Ni, Cr, Co, or Mo.

22. The method of claim 21, further comprising forming at least one outer coating on the compliance-enhancing coating.

* * * * *